(12) United States Patent
Lu

(10) Patent No.: US 9,140,292 B2
(45) Date of Patent: Sep. 22, 2015

(54) ANTI-LOOSE SCREW AND A DIE DEVICE FOR FORMING SAME

(71) Applicant: Hsiao-Shun Lu, Taipei (TW)

(72) Inventor: Cheng-Chuan Lu, Tainan (TW)

(73) Assignee: Hsiao-Chun Lu, Taipei (TW)

( * ) Notice: Subject to any disclaimer, the term of this patent is extended or adjusted under 35 U.S.C. 154(b) by 107 days.

(21) Appl. No.: 13/968,474

(22) Filed: Aug. 16, 2013

(65) Prior Publication Data

US 2015/0050102 A1    Feb. 19, 2015

(51) Int. Cl.
| | |
|---|---|
| *F16B 39/30* | (2006.01) |
| *F16B 39/28* | (2006.01) |
| *B21H 3/02* | (2006.01) |
| *B21H 3/06* | (2006.01) |

(52) U.S. Cl.
CPC ............... *F16B 39/28* (2013.01); *B21H 3/025* (2013.01); *B21H 3/06* (2013.01)

(58) Field of Classification Search
CPC ...... F16B 39/025; F16B 39/026; F16B 39/12; F16B 39/16; F16B 39/22; F16B 39/28; F16B 39/30; F16B 39/38; F16B 39/124; F16B 39/284; F16B 33/02
USPC .......................................................... 411/307
See application file for complete search history.

(56) References Cited

U.S. PATENT DOCUMENTS

| | | | | |
|---|---|---|---|---|
| 1,369,156 | A * | 2/1921 | Woodward | 411/307 |
| 2,581,690 | A * | 1/1952 | Moehle et al. | 411/308 |
| 3,323,402 | A * | 6/1967 | Gowen, Jr et al. | 411/411 |
| 3,433,117 | A * | 3/1969 | Gowen, Jr et al. | 411/411 |
| 3,589,157 | A * | 6/1971 | Tabor | 72/90 |
| 3,631,702 | A * | 1/1972 | Podell | 72/88 |
| 3,827,268 | A * | 8/1974 | Stover, III | 72/90 |
| 4,013,110 | A * | 3/1977 | Darling | 411/307 |
| 4,076,064 | A * | 2/1978 | Holmes | 411/285 |
| 4,136,416 | A * | 1/1979 | Thomas | 470/8 |
| 4,266,590 | A * | 5/1981 | McKewan | 411/307 |
| 4,351,626 | A * | 9/1982 | Holmes | 411/311 |
| 5,282,707 | A * | 2/1994 | Palm | 411/3 |
| 5,672,037 | A * | 9/1997 | Iwata | 411/311 |
| 5,876,168 | A * | 3/1999 | Iwata | 411/308 |
| 5,882,160 | A * | 3/1999 | Iwata | 411/307 |
| 5,944,465 | A * | 8/1999 | Janitzki | 411/310 |
| 6,190,101 | B1 * | 2/2001 | Janitzki | 411/310 |
| 7,828,500 | B2 * | 11/2010 | Curry | 411/308 |
| 7,997,842 | B2 * | 8/2011 | Diekmeyer | 411/366.1 |

\* cited by examiner

*Primary Examiner* — Roberta Delisle
(74) *Attorney, Agent, or Firm* — Alan D. Kamrath; Kamrath IP Lawfirm, P.A.

(57) ABSTRACT

An anti-loose screw (20) includes a shank (24) having an external thread (28) with a thread angle of 63° to 68° between two flanks (34, 36) extending between a crest (30) and a root (32). A first angle (A) between one of the flanks (34, 36) and an axis (Y) extending perpendicularly to a longitudinal axis (X) of the shank (24) and passing through the crest (30) is in a range between 34° and 40°. A second angle (B) between the other flanks (34, 36) and the axis (Y) is in a range between 25° and 29°. The anti-loose screw (20) can engage with an object (40) having an internal thread (42) with a thread angle of 60° to provide an interference fit and can be formed by two dies (120, 140) each including a thread forming configuration (128, 148) having correspondingly formed ridges (130, 150) and valleys (136, 156).

8 Claims, 12 Drawing Sheets

ANTI-LOOSE SCREW AND A DIE DEVICE FOR FORMING SAME

BACKGROUND OF THE INVENTION

The present invention relates to an anti-loose screw and a die device for forming the anti-loose screw and, more particularly, to an anti-loose screw including a thread angle larger than 60° for providing an anti-loose effect when engaged with an internal thread formed in an object and having a thread angle of 60°. The present invention also relates to a combination including the anti-loose screw and the object and relates to a die device for forming the anti-loose screw.

Screws are widely used in daily life and are engaged in internal threads in objects. A C-shaped spring washer is often mounted around a screw to prevent the screw from becoming loosened from the internal thread in an object. The spring washer is compressed and deformed to provide a reactive force by its elasticity, providing an anti-loose effect. However, the spring washer can not be used in a limited space. To solve this limitation, some manufacturers apply a coating on the thread of the screw or the internal thread of the object. The coating is compressed and deformed to provide the desired anti-loose effect. However, the coating results in a significant increase in the manufacturing costs.

Thus, a need exists for a novel anti-loose screw free of coating and for a novel die device for forming the anti-loose screw.

BRIEF SUMMARY OF THE INVENTION

The present invention solves this need and other problems in the field of inexpensive anti-loose screws by providing, in a first aspect, an anti-loose screw, and in a second aspect, a combination of the anti-loose screw and an object. The anti-loose screw includes a head and a shank extending from a side of the head. The shank includes an external thread formed on an outer periphery thereof. The external thread includes a crest and a root. The crest and the root are helical. A first flank and a second flank extend between the crest and the root. The external thread includes a thread angle of 63° to 68° between the first and second flanks. The shank includes a longitudinal axis. An axis extends perpendicularly to the longitudinal axis and passes through the crest. The thread angle includes a first angle and a second angle. The first angle is defined between the axis and one of the first and second flanks. The second angle is defined between the axis and the other of the first and second flanks. The first angle is in a range between 34° and 40°. The second angle is in a range between 25° and 29°. The object includes an internal thread having a thread angle of 60°. The internal thread has a pitch equal to a pitch of the external thread of the anti-loose screw. The internal thread includes a helical crest and a helical root. The internal thread further includes a first flank and a second flank.

When the shank of the anti-loose screw is engaged in the object, the external thread has an interference fit with the internal thread. At least one of a contact portion of the external thread and a contact portion of the internal thread contacting with the contact portion of the external thread is deformed.

In a third aspect, a die device is provided to form the anti-loose screw. The die device includes a first die and a second die. Each of the first and second dies includes two ends spaced from each other along a longitudinal axis. An operative surface extends between the two ends and has a thread forming configuration. The thread forming configuration includes a plurality of ridges parallel to and spaced from each other and a plurality of valleys parallel to and spaced from each other and parallel to the plurality of ridges. A spacing between two adjacent ridges of the first die is equal to a spacing between two adjacent ridges of the second die. A spacing between two adjacent valleys of the first die is equal to a spacing between two adjacent valleys of the second die. Each of the plurality of ridges and each of the plurality of valleys are skewed relative to the longitudinal axis. Each of the plurality of valleys is located between two adjacent ridges. Each of the plurality of ridges is located between two adjacent valleys and includes first and second sides. The first side is located between the ridge and one of the two adjacent valleys, and the second side is located between the ridge and the other of the two adjacent valleys. An acute angle between the first and second sides is in a range from 63° to 68°, and the acute angle includes a first angle and a second angle. The first angle is defined between the first side and an axis extending perpendicularly to a tangent of the ridge, and the second angle is defined between the axis and the second side. The first angle is in a range between 34° and 40°, and the second angle is in a range between 25° and 29°. The first angle of the first die is equal to the first angle of the second die, and the second angle of the first die is equal to the second angle of the second die.

An outer periphery of a shank of a screw blank is adapted to be sandwiched between the first and second dies, with the operative surfaces parallel to and spaced from each other. The second die is adapted to be moved relative to the first die along the longitudinal axis to press against and to rotate the shank, forming an external thread on the outer periphery of the shank. The external thread has a thread angle of 63° to 68°.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
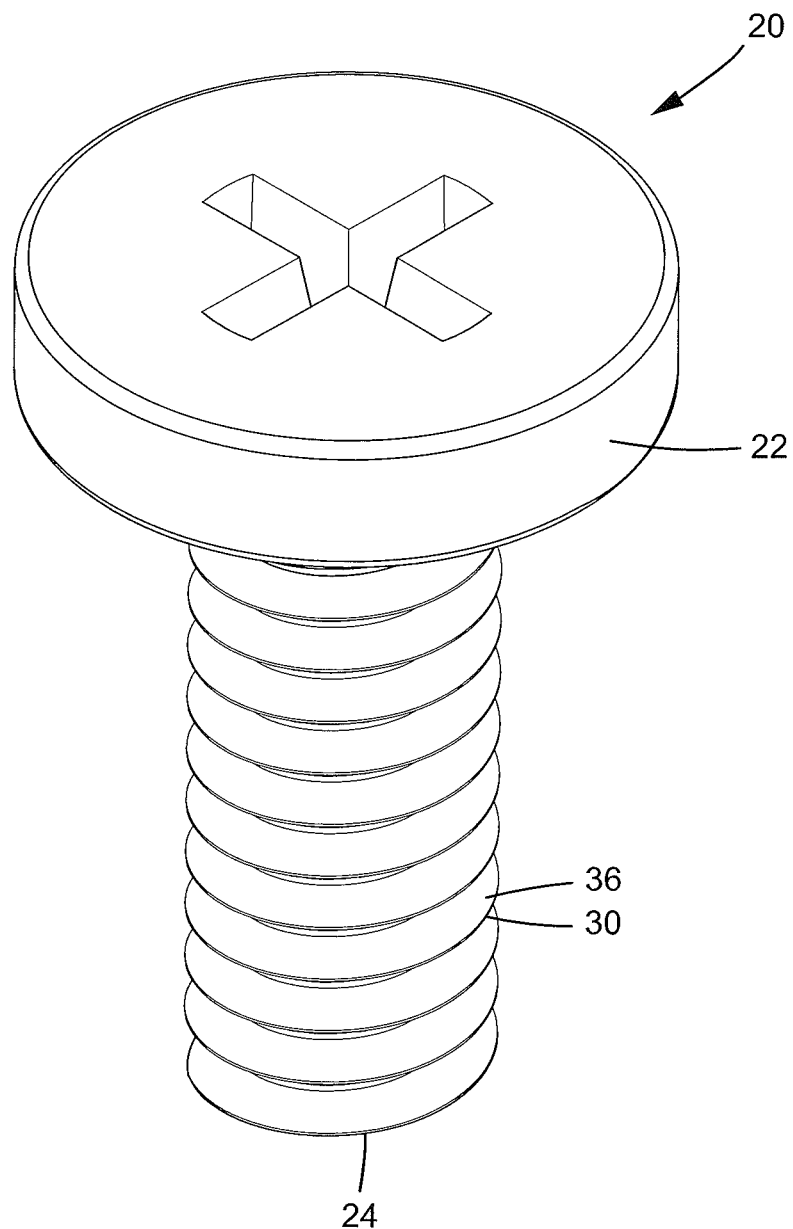
FIG. 1 is a perspective view of an anti-loose screw according to the present invention.
Figure 2:
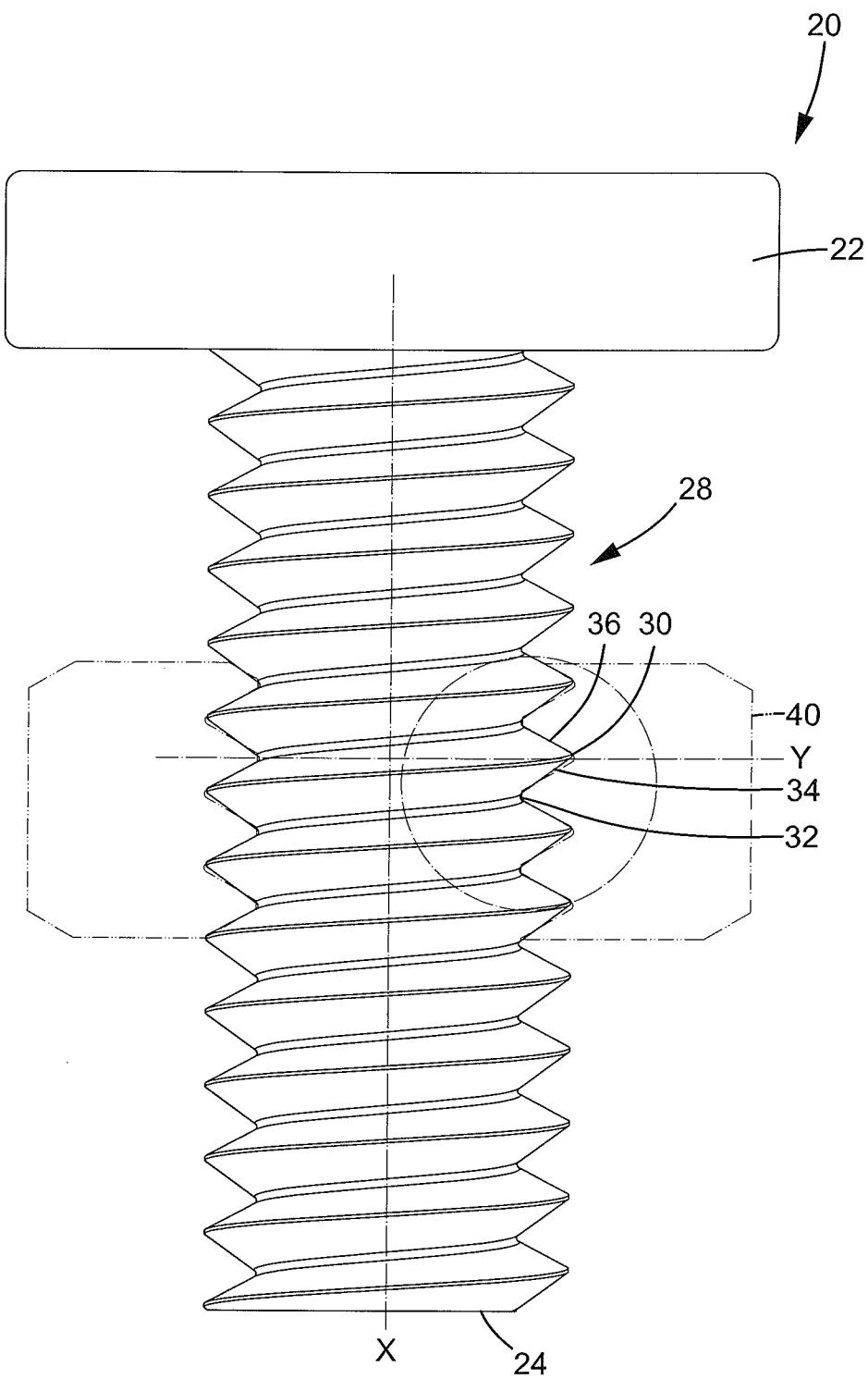
FIG. 2 is a side elevational view of the anti-loose screw of FIG. 1, with the anti-loose screw engaged in an object shown in phantom lines.
Figure 3:
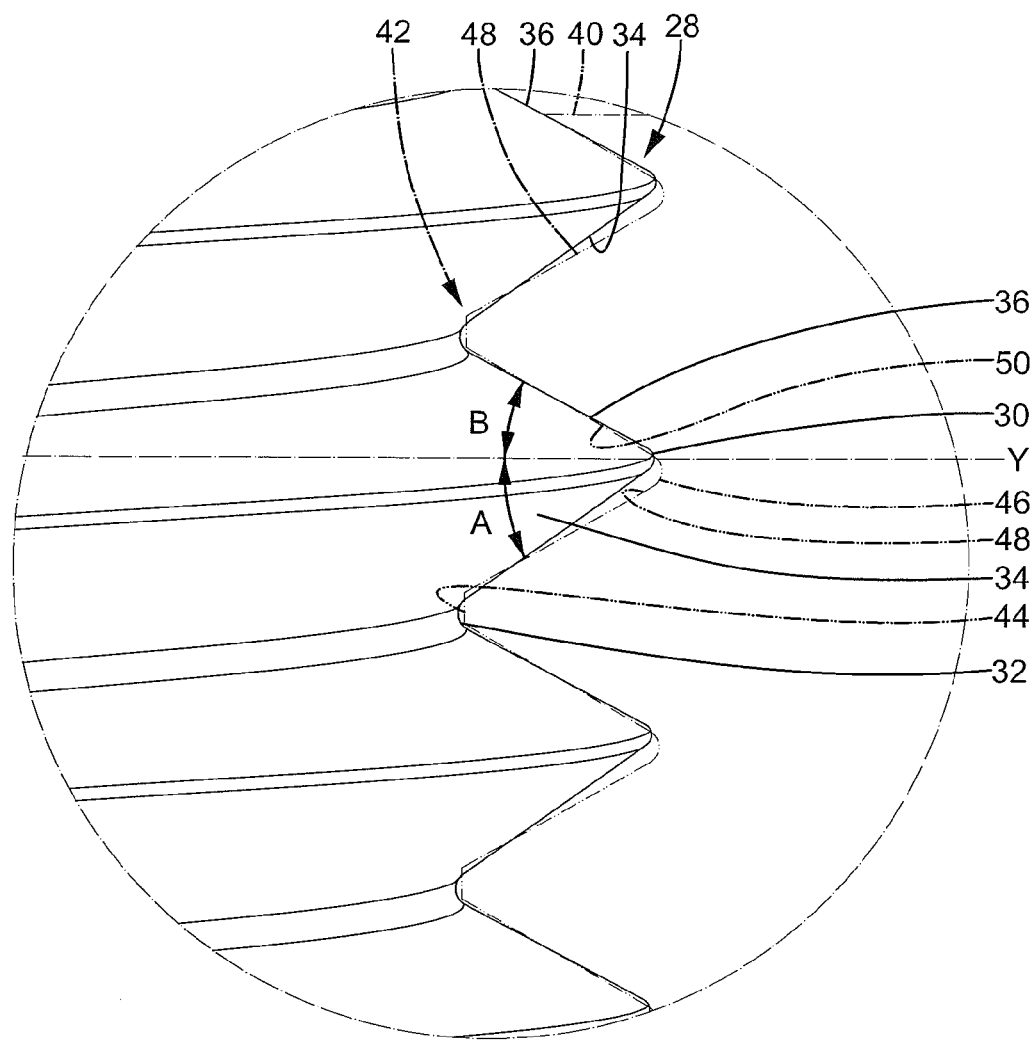
FIG. 3 is an enlarged view of a circled portion in FIG. 2.
Figure 4:
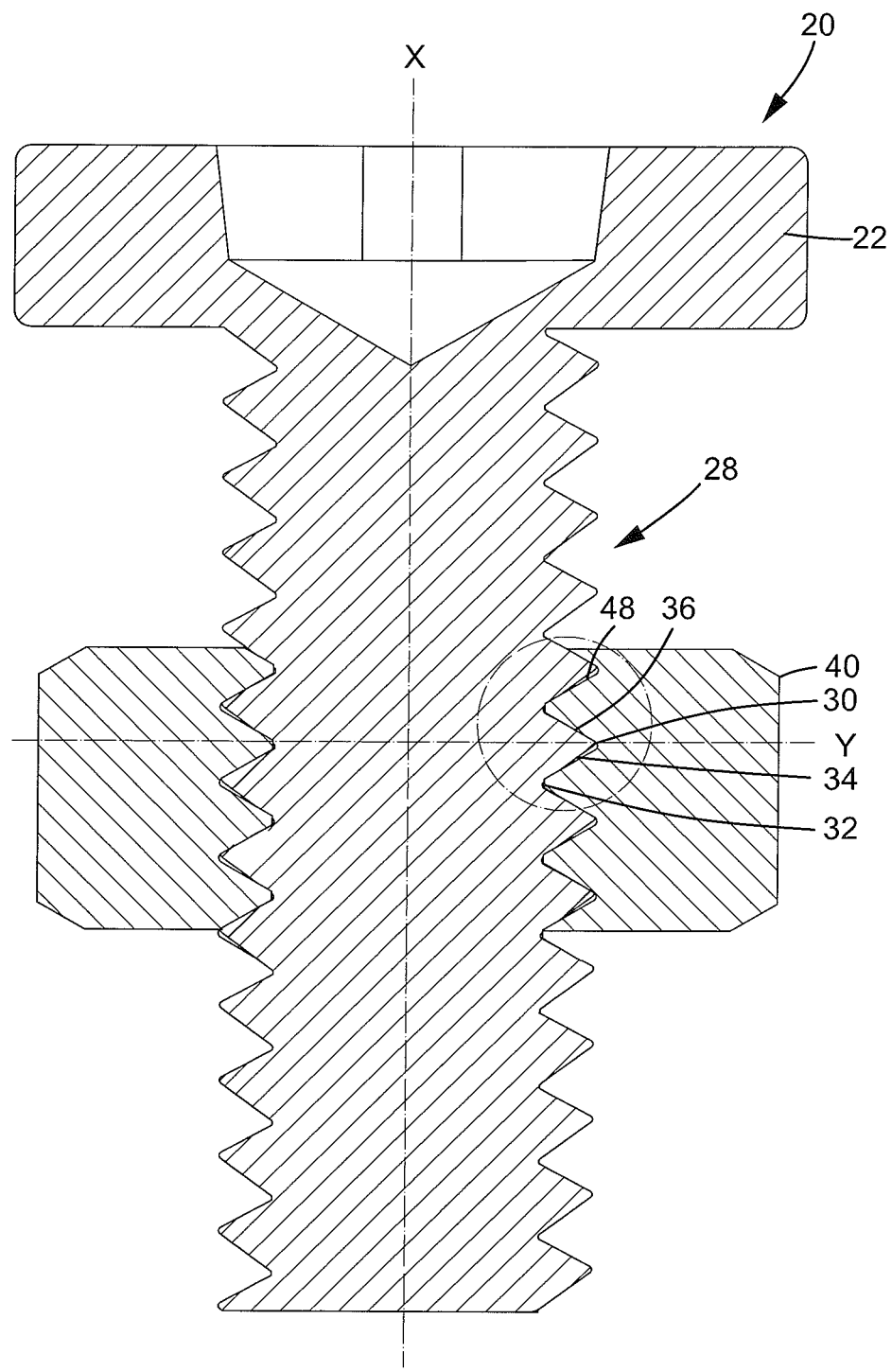
FIG. 4 is a cross sectional view of the anti-loose screw of FIG. 1 and an object engaged with the anti-loose screw.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "internal", "external", "side", "end", "surface", "spacing", "longitudinal", "length", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

With reference to FIGS. 1-5, an anti-loose screw 20 according to the present invention includes a head 22 and a shank 24 extending from a side of the head 22. Shank 24 includes an external thread 28 formed on an outer periphery thereof. External thread 28 can be a right hand thread or a left hand thread. In the form shown, external thread 28 is a right hand thread. External thread 28 includes a crest 30 and a root 32. Crest 30 and root 32 are helical. A first flank 34 and a second flank 36 extend between crest 30 and root 32.

External thread 28 includes a thread angle of 63° to 68° between first and second flanks 34 and 36. Preferably, the thread angle is about 64°. Shank 24 includes a longitudinal axis X. An axis Y extends perpendicularly to longitudinal axis X and passes through crest 30. The thread angle includes a first angle A and a second angle B. First angle A is defined between axis Y and one of first and second flanks 34 and 36, and second angle B is defined between axis Y and the other of first and second flanks 34 and 36. First angle A is in a range between 34° and 40°, and second angle B is in a range between 25° and 29°, which is different from the conventional half thread angle of 30° of a conventional external thread having a thread angle of 60°. In the form shown, first angle A is defined between axis Y and first flank 34, and second angle B is defined between axis Y and second flank 36.

Anti-loose screw 20 can be engaged with an object 40 to provide an interference fit. Object 40 can be a nut or a housing of a notebook made of aluminum-magnesium alloy and includes an internal thread 42 having a pitch equal to a pitch of external thread 28 of anti-loose screw 20. Furthermore, internal thread 42 includes a helical crest 44 and a helical root 46. Internal thread 42 further includes first and second flanks 48 and 50 extending between helical crest 44 and helical root 46. A thread angle between first and second flanks 48 and 50 is 60°. An angle between first flank 48 and an axis parallel to axis Y and passing through helical crest 44 is 30°, and an angle between second flank 50 and the axis parallel to axis Y and passing through helical crest 44 is 30°. The pitch diameter of internal thread 42 is preferably slightly larger than the pitch diameter of external thread 28. When anti-loose screw 20 is rotated while shank 24 of anti-loose screw 20 is received in object 40, external thread 28 has an interference fit with internal thread 42. At least one of a contact portion of external thread 28 and a contact portion of internal thread 42 contacting with the contact portion of external thread 28 is squeezed and deformed, increasing normal forces acting on each other. The frictional force at the contact portions of internal thread 42 and external thread 28 is, thus, increased, preventing loosening of anti-loose screw 20 and object 40 even if object 40 is subject to regular or irregular vibrations. The best anti-loosening effect can be provided when the thread angle is about 64°.

Figure 5:
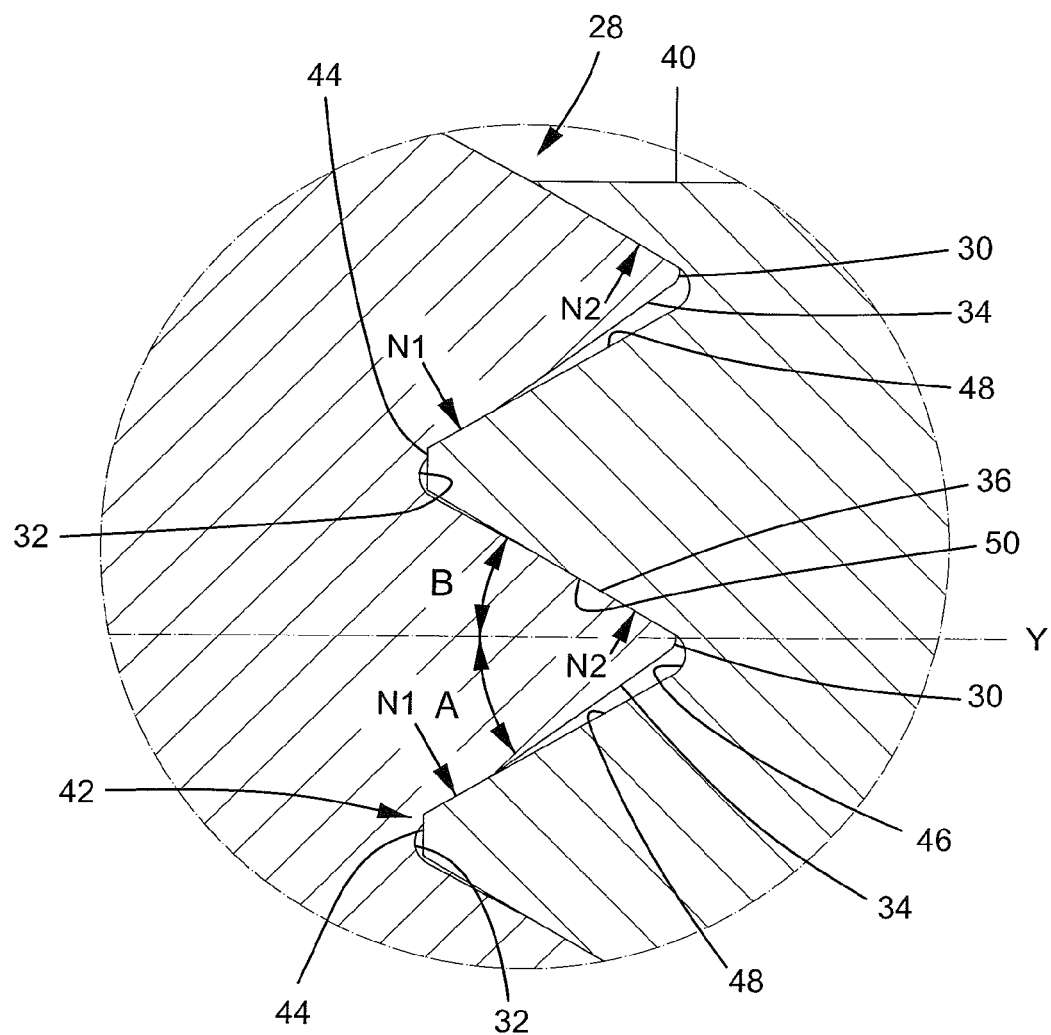
FIG. 5 is an enlarged view of a circled portion in FIG. 4.
Figure 6:
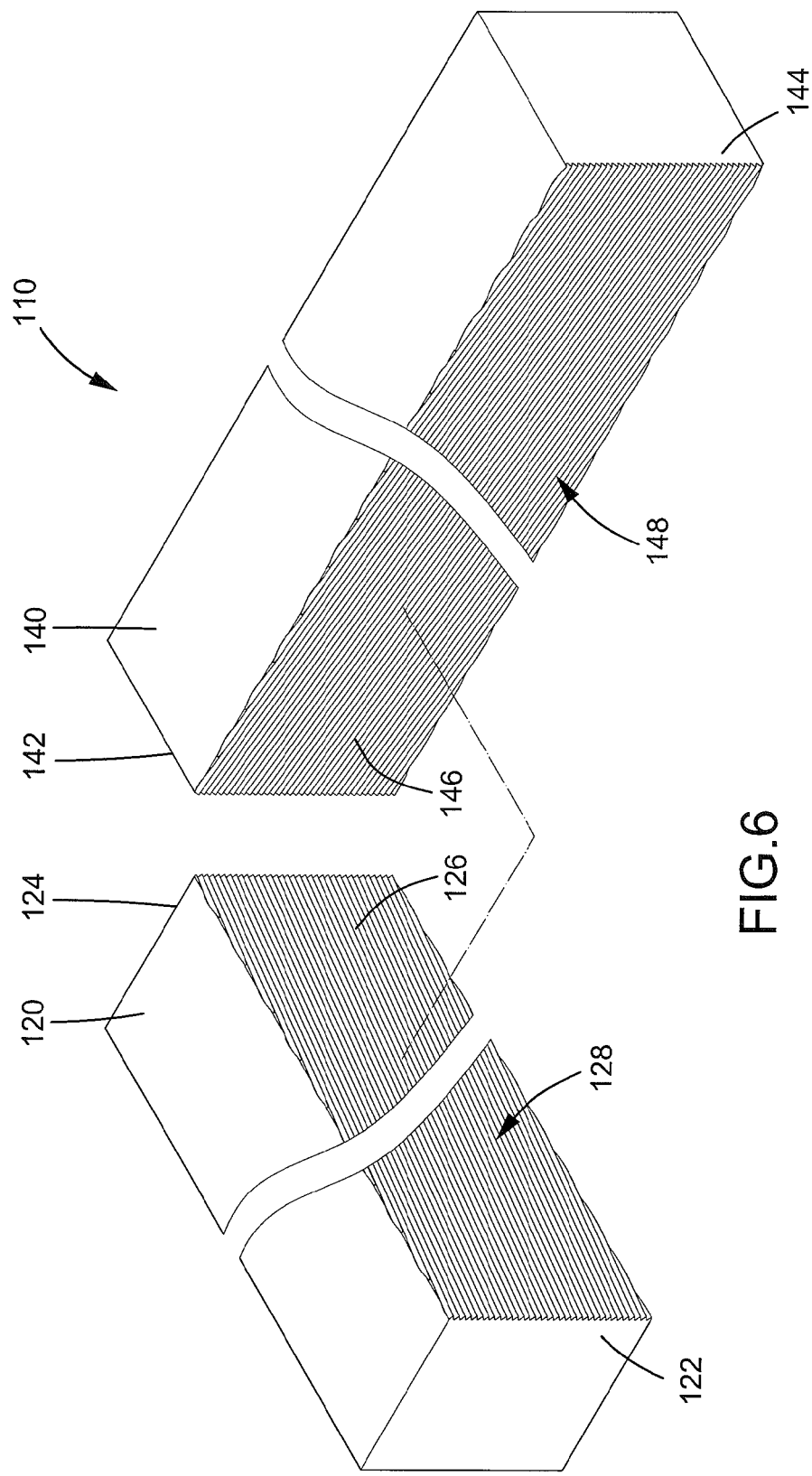
FIG. 6 is an exploded, perspective view of a die device for forming the anti-loose screw according to the present invention.

In a case that object 40 is more rigid than anti-loose screw 20, external thread 28 of anti-loose screw 20 is deformed due to the interference fit between external thread 28 and internal thread 42 engaged with external thread 28. A normal force N1 presses against the contact portion of first flank 48 of internal thread 42. Another normal force N2 presses against the contact portion of second flank 50 of internal thread 42, as shown in FIG. 5. Thus, first and second flanks 48 and 50 of internal thread 42 are pressed by normal forces N1 and N2 to increase the frictional force between external thread 28 of anti-loose screw 20 and internal thread 42 of object 40. The best anti-loosening effect can be provided when the thread angle is about 64°.

Thus, by providing external thread 28 of anti-loose screw 20 with a thread angle having unequal first and second angles A and B, external thread 28 of anti-thread screw 20 can have an interference fit with conventional internal thread 42 having a thread angle of 60°, providing an excellent anti-loose effect by generating sufficient frictional force through deformation resulting from the interference fit. Namely, anti-loose screw 20 can be easily engaged with internal thread 42 of object 40 by applying a small force. Furthermore, a better tightening effect is obtained due to an increase in the frictional force after engagement of internal thread 42 and external thread 28. Thus, anti-loose screw 20 is still in firm engagement with object 40 even if object 40 is subjected to regular or irregular vibrations during work. Thus, it is not necessary to apply a coating on external thread 28, saving the manufacturing costs of anti-loose screw 20.

On the other hand, if object 40 is less rigid than anti-loose screw 20, internal thread 42 of object 40 is deformed after engagement of external thread 28 and internal thread 42, providing the desired loosening prevention effect. In another case that object 40 is as rigid as anti-loose screw 20, internal thread 42 of object 40 and external thread 28 of anti-loose screw 20 are deformed after engagement of external thread 28 and internal thread 42, providing the desired loosening prevention effect.

With reference to FIGS. 6-12, anti-loose screw 20 can be formed by a die device 110 including first and second dies 120 and 140. Each of first and second dies 120 and 140 is a parallelepiped. Specifically, each of first and second dies 120 and 140 includes two ends 122 and 124, 142 and 144 spaced from each other along a longitudinal axis. An operative surface 126, 146 extends between ends 122 and 124, 142 and 144 and has a thread forming configuration 128, 148. Thread forming configuration 128, 148 includes a plurality of ridges 130, 150 parallel to and spaced from each other and a plurality of valleys 136, 156 parallel to and spaced from each other and parallel to ridges 130, 150. A spacing between two adjacent ridges 130 of first die 120 is equal to a spacing between two adjacent ridges 150 of second die 140. A spacing between two adjacent valleys 136 of first die 120 is equal to a spacing between two adjacent valleys 156 of second die 140. Each ridge 130, 150 and each valley 136, 156 are skewed relative to the longitudinal axis. Each valley 136, 156 is located between two adjacent ridges 130, 150.

Each ridge 130, 150 is located between two adjacent valleys 136, 156 and includes first and second sides 132 and 134, 152 and 154. First side 132, 152 is located between ridge 130, 150 and one of the two adjacent valleys 136, 156. Second side 134, 154 is located between ridge 130, 150 and the other of the two adjacent valleys 136, 156. An acute angle between first and second sides 132 and 134, 152 and 154 is in a range from 63° to 68°. Preferably, the acute angle of each of the first and second dies 120, 140 is about 64°. The acute angle includes a first angle C, E and a second angle D, F. First angle C, E is defined between first side 132, 152 and an axis Y1, Y2 extending perpendicularly to a tangent of ridge 130, 150. Second angle D, F is defined between second side 134, 154 and axis Y1, Y2. First angle C, E is in a range between 34° and 40°, and second angle D, F is in a range between 25° and 29°. First angle C of first die 120 is equal to first angle E of second die 140, and second angle D of first die 120 is equal to second angle F of second die 140.

Figure 7:
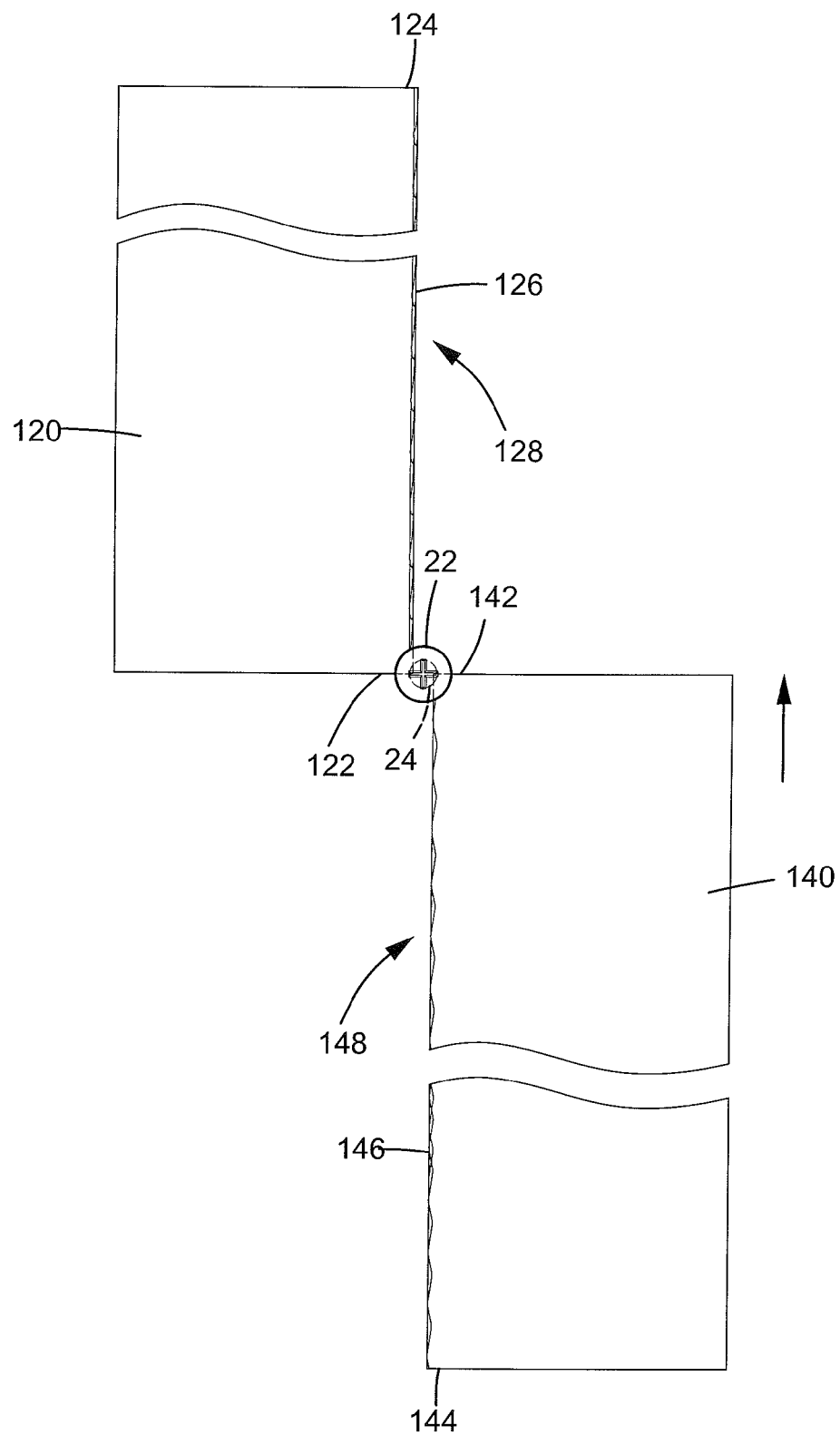
FIG. 7 is a schematic diagram of a blank for the anti-loose screw and the die device in a position ready for forming the anti-loose screw.
Figure 8:
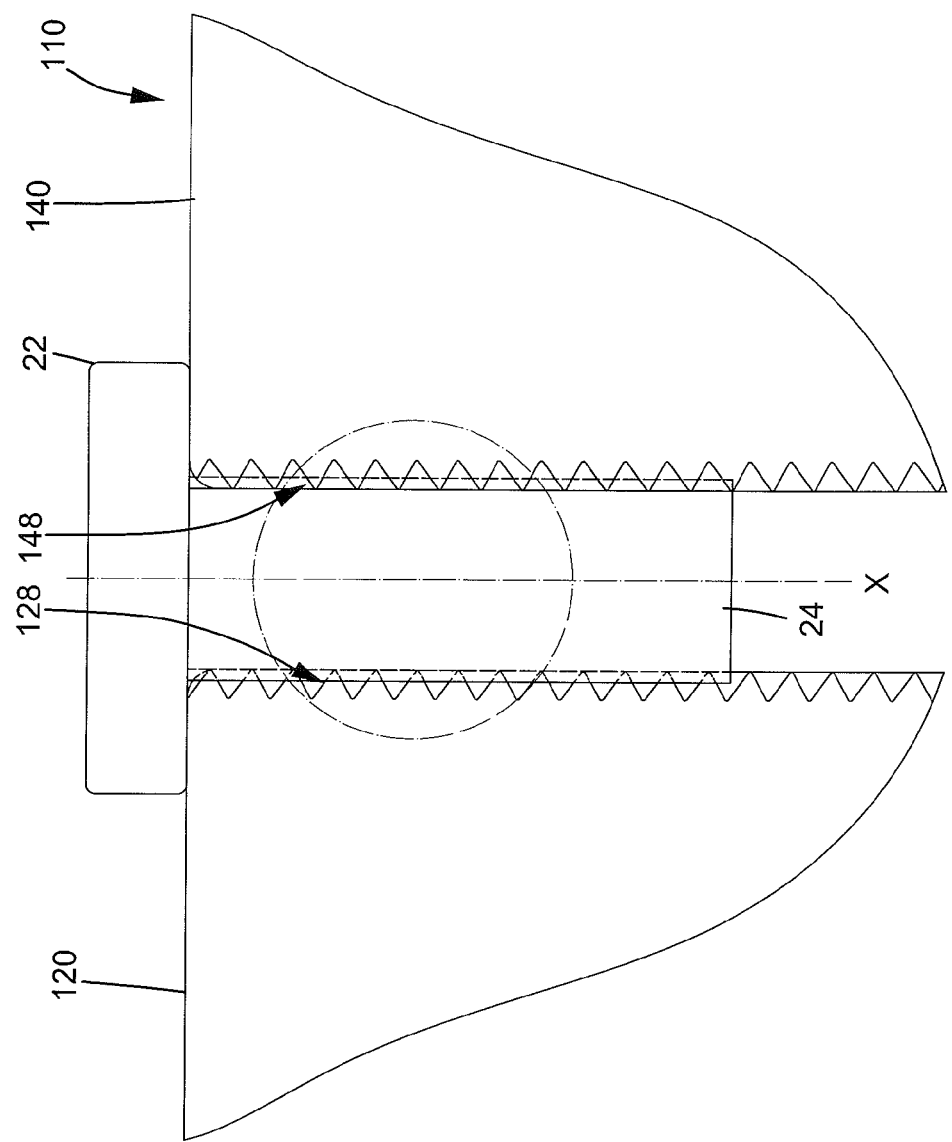
FIG. 8 is an enlarged, side elevational view of a portion of FIG. 7 viewed from another side.
Figure 9:
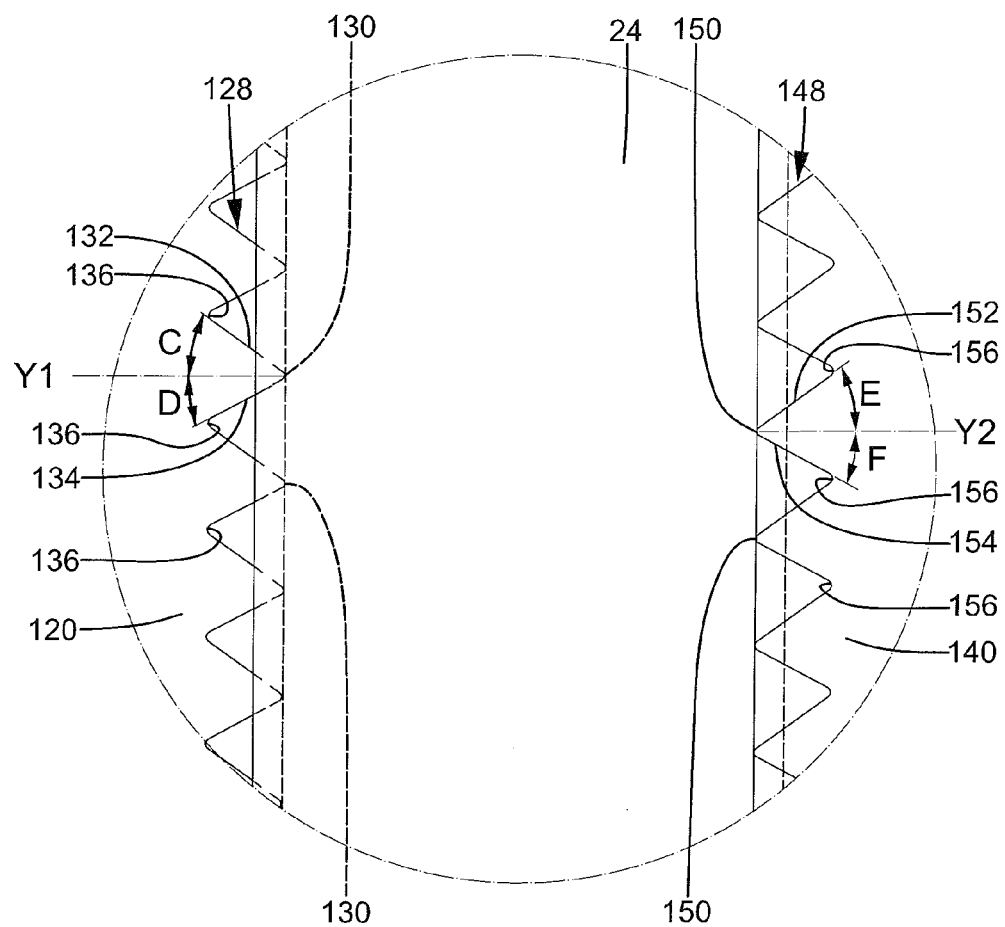
FIG. 9 is an enlarged view of a circled portion in FIG. 8.
Figure 10:
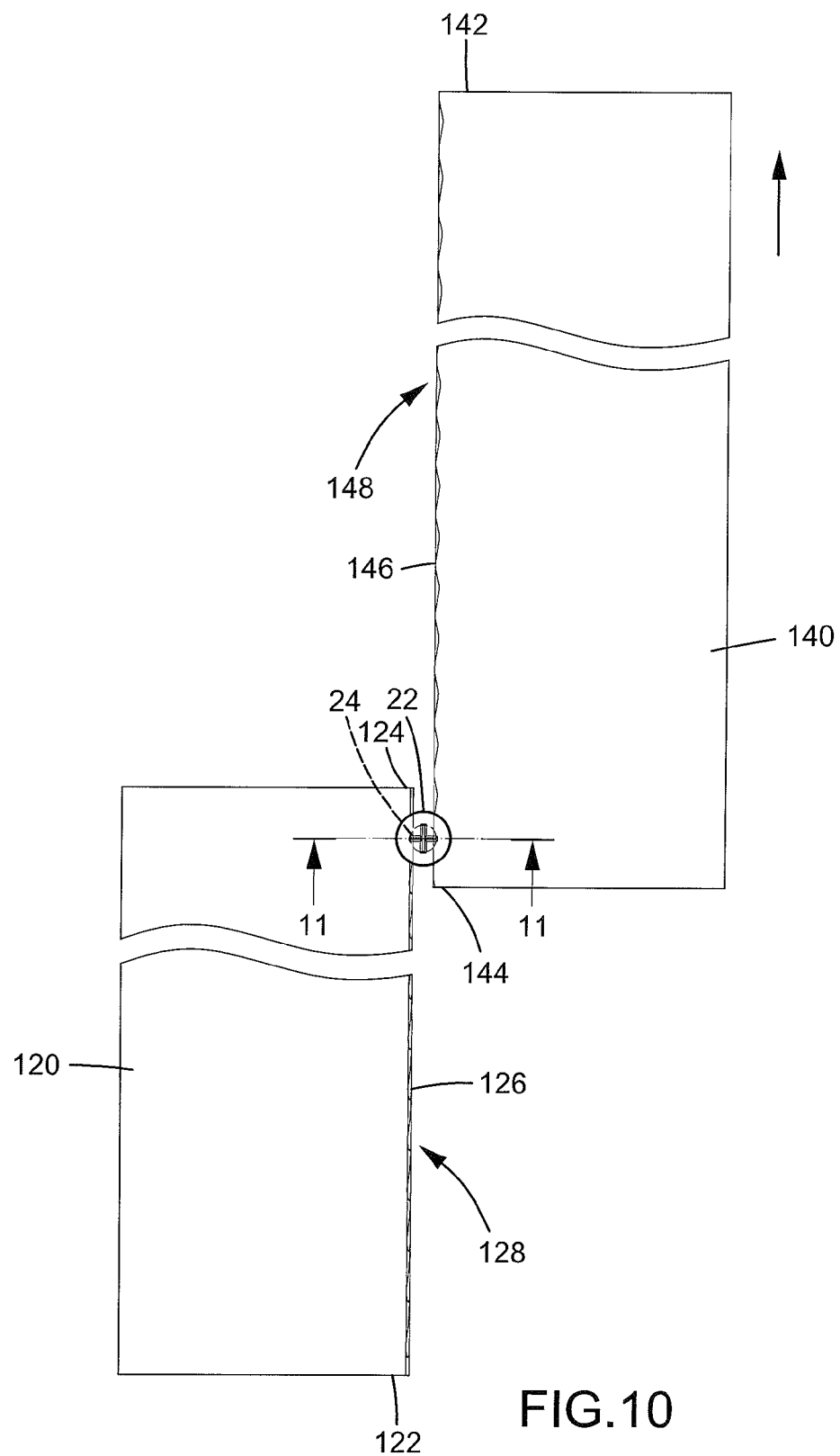
FIG. 10 is a view similar to FIG. 7, with a die moved relative to the other die.

In production, first and second dies 120 and 140 are placed on a screw thread forming machine and located at the same height. First die 120 is fixed on the screw thread forming machine, and second die 140 is mounted on a reciprocating mechanism on the screw thread forming machine. End 142 of second die 140 is aligned with end 122 of first die 120. Operative surfaces 126 and 146 of first and second dies 120 and 140 are parallel to and spaced from each other. A spacing between operative surfaces 126 and 146 is substantially the same as the pitch diameter of an anti-loose screw 20 to be formed from a screw blank having a shank 24 and a head 22. Shank 24 of the screw blank is fed by a feeding device to a location between end 122 of first die 120 and end 142 of second die 140. An outer periphery of shank 24 of the screw blank is sandwiched between operative surfaces 126 and 146 (FIGS. 7 and 8).

Figure 11:
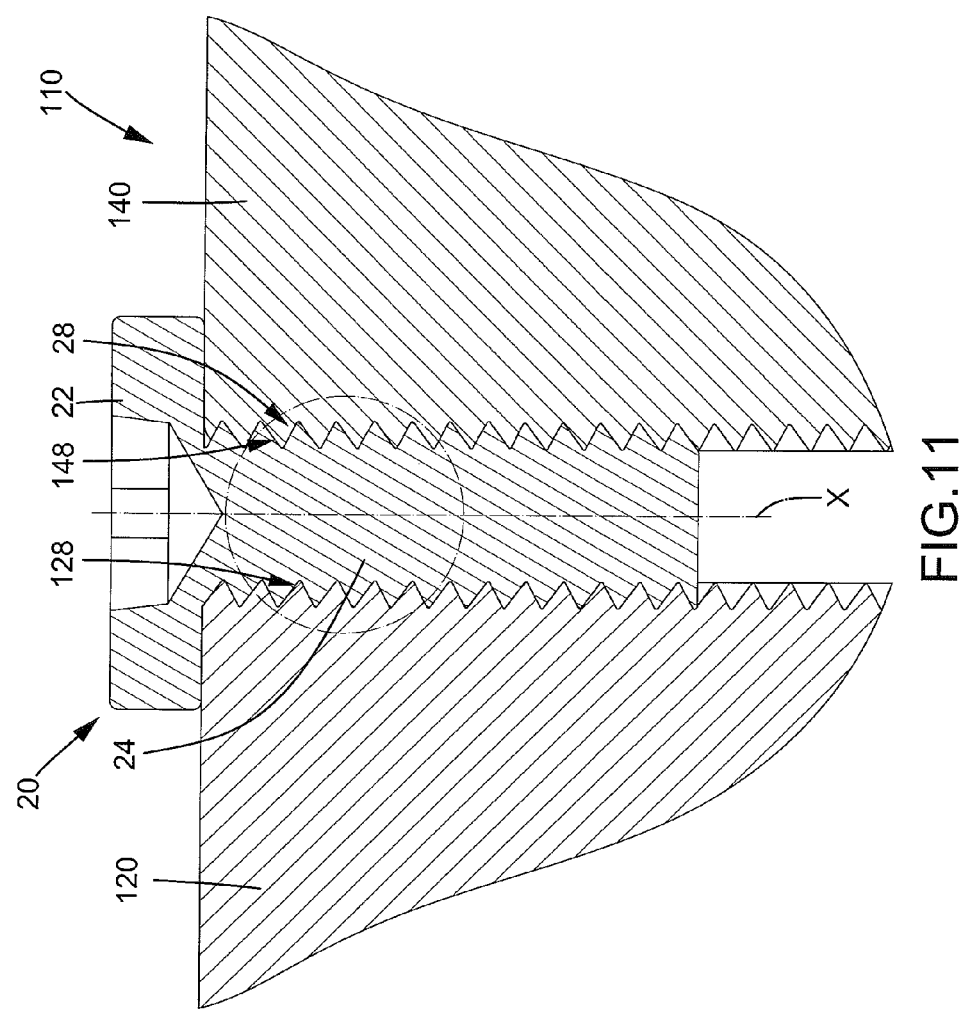
FIG. 11 is an enlarged, cross sectional view taken along section line 11-11 of FIG. 10.

The screw thread forming machine is activated such that the operative surface 146 on end 142 of second die 140 presses against the outer periphery of shank 24 of the screw blank, and end 142 of second die 140 moves towards end 124 of first die 120, causing rotation of shank 24 about its longitudinal axis X. Thread forming configurations 128 and 148 of first and second dies 120 and 140 squeeze the outer periphery of shank 24 of the screw blank. Ridges 130 and 150 of first and second dies 120 and 140 form helical root 32 on the outer periphery of shank 24. First and second sides 132 and 152 of first and second dies 120 and 140 form first and second blanks 34 and 36 on the outer periphery of shank 24. Valleys 136 and 156 of first and second dies 120 and 140 form helical crest 30 on the outer periphery of shank 24. When end 144 of second die 140 approaches end 124 of first die 120 (FIG. 10), an external thread 28 is formed on the outer periphery of shank 24 (FIG. 11).

Figure 12:
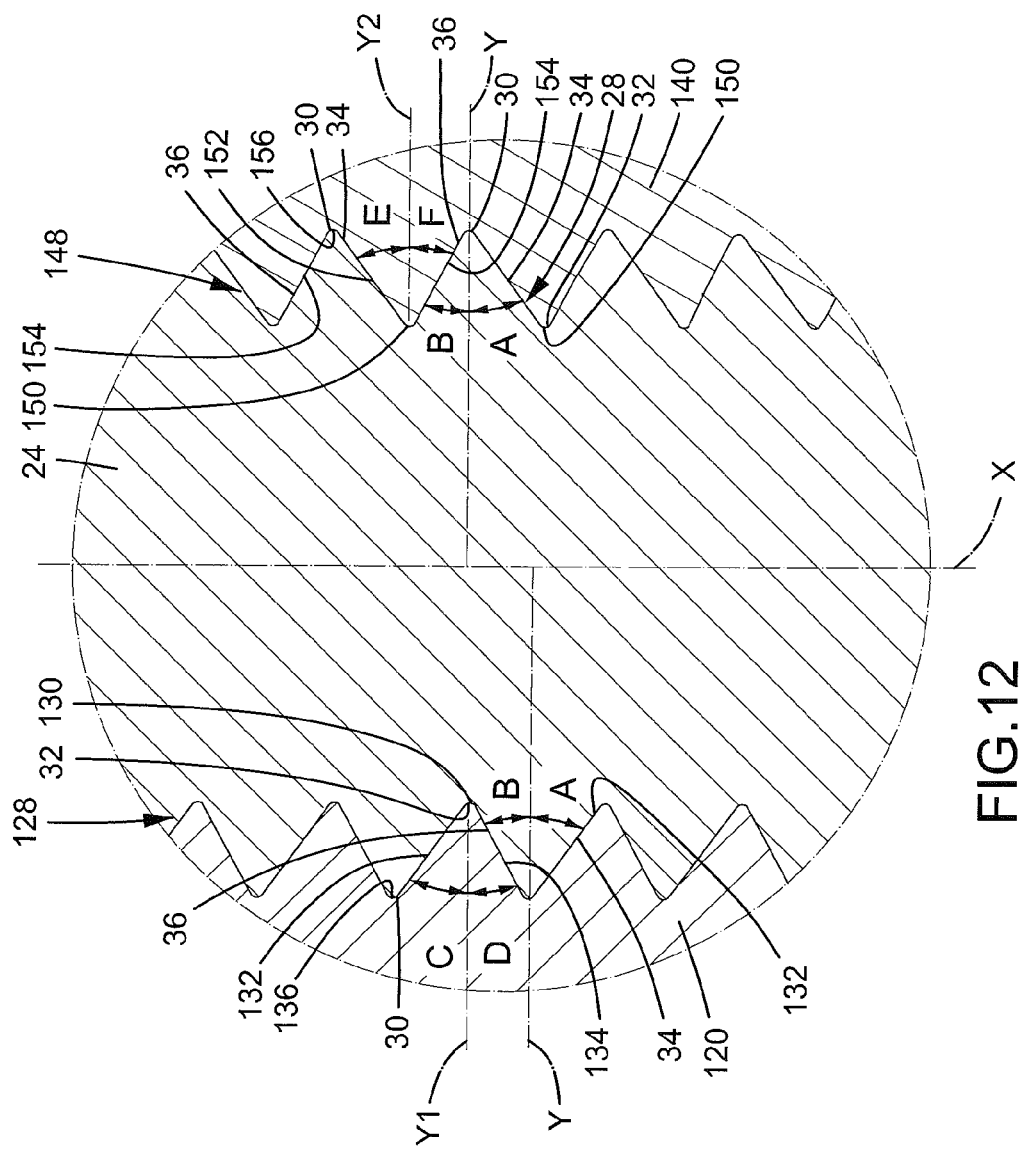
FIG. 12 is an enlarged view of a circled portion in FIG. 11.

Since external thread 28 is complimentary to thread forming configuration 128, 148, the thread angle of external thread 28 is in a range from 63° to 68°. First angle A of external thread 28 is equal to first angle C of first die 120 and equal to first angle E of second die 140. Second angle B of external thread 28 is equal to second angle D of first die 120 and equal to second angle F of second die 140 (FIG. 12).

A length of second die 140 in the movement direction is larger than that of fixed first die 120. Thus, when second die 140 squeezes shank 24 and rotates shank 24 to end 144 of first die 120, shank 24 is moved by second die 140 to end 124 of first die 120 and then falls downward from end 124 of first die 120, completing formation of external thread 28 on shank 24. The reciprocating mechanism moves second die 140 to its initial position shown in FIG. 7, which is ready for formation of an external thread 28 on a shank 24 of another screw blank fed by the feeding device.

External thread 28 of shank 24 formed by die device 110 is a right handed thread. An anti-loose screw 20 with a left handed external thread 28 can be obtained by changing the inclination orientation of thread forming configurations 128 and 148.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. An anti-loose screw comprising a head and a shank extending from a side of the head, with the shank including an external thread formed on an outer periphery thereof, with the external thread including a crest and a root, with the crest and the root being helical, with a first flank and a second flank extending between the crest and the root, with the external thread including a thread angle of 63° to 68° between the first and second flanks, with the shank including a longitudinal axis, with an axis extending perpendicularly to the longitudinal axis and passing through the crest, with the thread angle including a first angle and a second angle, with the first angle defined between the axis and one of the first and second flanks, with the second angle defined between the axis and another of the first and second flanks, with the first angle being in a range between 34° and 40°, and with the second angle being in a range between 25° and 29°.

2. The anti-loose screw as claimed in claim 1, wherein the thread angle of the external thread is about 64°.

3. The anti-loose screw as claimed in claim 1, with the anti-loose screw adapted to couple with an object including an internal thread having a thread angle of 60°, with the internal thread having a pitch equal to a pitch of the external thread of the anti-loose screw, with the internal thread including a helical crest and a helical root, and with the internal thread further including a first flank and a second flank, wherein when the shank of the anti-loose screw is engaged in the object, the external thread has an interference fit with the internal thread, at least one of a contact portion of the external thread and a contact portion of the internal thread contacting with the contact portion of the external thread is deformed, and with the shank of the anti-loose screw engaged in the object, with a first normal force pressing against the contact portion of the first flank of the internal thread of the object on a first interference point, with a spacing between the first interference point and the root of the anti-loose screw being smaller than a spacing between the first interference point and the crest of the anti-loose screw, with a second normal force pressing against the contact portion of the second flank of the internal thread of the object on a second interference point, with a spacing between the second interference point and the root of the anti-loose screw being larger than a spacing between the second interference point and the crest of the anti-loose screw.

4. A combination comprising:

an anti-loose screw including a head and a shank extending from a side of the head, with the shank including an external thread formed on an outer periphery thereof, with the external thread including a crest and a root, with the crest and the root being helical, with a first flank and a second flank extending between the crest and the root, with the external thread including a thread angle of 63° to 68° between the first and second flanks, with the shank including a longitudinal axis, with an axis extending perpendicularly to the longitudinal axis and passing through the crest, with the thread angle including a first angle and a second angle, with the first angle defined between the axis and one of the first and second flanks, with the second angle defined between the axis and another of the first and second flanks, with the first angle being in a range between 34° and 40°, and with the second angle being in a range between 25° and 29°; and an object including an internal thread having a thread angle of 60°, with the internal thread having a pitch equal to a pitch of the external thread of the anti-loose screw, with the internal thread including a helical crest and a helical root, and with the internal thread further including a first flank and a second flank, wherein when the shank of the anti-loose screw is engaged in the object, the external thread has an interference fit with the internal thread, at least one of a contact portion of the external thread and a contact portion of the internal thread contacting with the contact portion of the external thread is deformed.

5. The combination as claimed in claim 4, wherein the thread angle of the external thread is about 64°.

6. The combination as claimed in claim 4, with the shank of the anti-loose screw engaged in the object, with a first normal force pressing against the contact portion of the first flank of the internal thread of the object on a first interference point, with a spacing between the first interference point and the root of the anti-loose screw being smaller than a spacing between the first interference point and the crest of the anti-loose screw, with a second normal force pressing against the contact portion of the second flank of the internal thread of the object on a second interference point, with a spacing between the second interference point and the root of the anti-loose screw being larger than a spacing between the second interference point and the crest of the anti-loose screw.

7. A die device for forming an anti-loose screw, comprising:

a first die and a second die, with each of the first and second dies including two ends spaced from each other along a longitudinal axis, with an operative surface extending between the two ends and having a thread forming configuration, with the thread forming configuration including a plurality of ridges parallel to and spaced from each other and a plurality of valleys parallel to and spaced from each other and parallel to the plurality of ridges, with a spacing between two adjacent ridges of the first die equal to a spacing between two adjacent ridges of the second die, with a spacing between two adjacent valleys of the first die equal to a spacing between two adjacent valleys of the second die, with each of the plurality of ridges and each of the plurality of valleys being skewed relative to the longitudinal axis, with each of the plurality of valleys located between two adjacent ridges, with each of the plurality of ridges located between two adjacent valleys and including first and second sides, with the first side located between the ridge and one of the two adjacent valleys, with the second side located between the ridge and another of the two adjacent valleys, with an acute angle between the first and second sides being in a range from 63° to 68°, with the acute angle including a first angle and a second angle, with the first angle defined between the first side and an axis extending perpendicularly to a tangent of the ridge, with the second angle defined between the axis and the second side, with the first angle being in a range between 34° and 40°, with the second angle being in a range between 25° and 29°, with the first angle of the first die equal to the first angle of the second die, and with the second angle of the first die equal to the second angle of the second die, wherein an outer periphery of a shank of a screw blank is adapted to be sandwiched between the first and second dies, with the operative surfaces parallel to and spaced from each other, with the second die adapted to be moved relative to the first die along the longitudinal axis to press against and to rotate the shank, forming an external thread on the outer periphery of the shank, with the external thread having a thread angle of 63° to 68°.

8. The die device as claimed in claim 7, wherein the acute angle of each of the first and second dies is about 64°.

\* \* \* \* \*